Patented Apr. 18, 1939

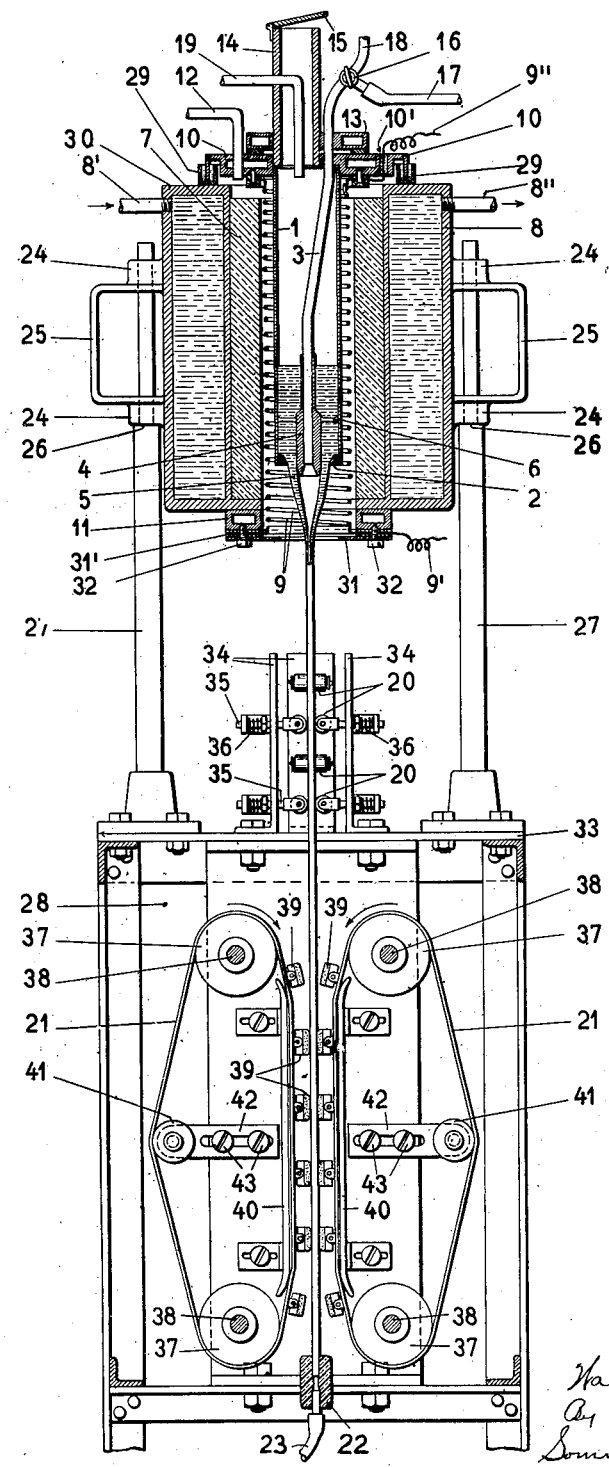

2,155,131

UNITED STATES PATENT OFFICE 2,155,131

APPARATUS FOR DRAWING PIPES FROM QUARTZ OR GLASS HAVING A HIGH CONTENT IN SILICIC ACID

Walter Hänlein, Berlin-Spandau, Germany, assignor to Patent-Treuhand-Gesellschaft für Elektrische Glühlampen m. b. H., Berlin, Germany Application March 8, 1938, Serial No. 194,677
In Germany March 12, 1937

6 Claims. (Cl. 49—17.1)

My invention relates to improvements in apparatus for drawing pipes from quartz or glass having a high content in silicic acid, and more particularly in apparatus of the type comprising a gas or electrically heated melting receptacle equipped at its bottom with an annular drawing nozzle. In constructions now in use the melting receptacle has been made from different refractory materials, according to the melting properties of the glass, the said materials being ordinarily, in the case of quartz, a mixture of carbon and graphite. While by means of such apparatus ordinarily glass can be drawn without any difficulty, the operation is not satisfactory where quartz tubes are drawn, because the melting receptacle and particularly the drawing nozzle are attacked by the molten quartz. Further, at the high temperature needed for melting and drawing the quartz the vaporization of the quartz is so energetic that a deposit of quartz is produced on the wall of the pipe being drawn, and particularly on the inner wall thereof, which can be removed only with difficulty, and which renders the glass dim.

The object of the improvements is to provide an apparatus of the type indicated in which this objection is obviated, and with this object in view my invention consists in making the melting receptacle and the nozzle from metal which in a low degree is subject to destruction by the molten quartz, and further, provision is made for preventing action of the quartz vapor on the melting receptacle, the nozzle, the melting furnace and the pipe being formed. In carrying out the invention the tubular melting receptacle is made from a material of high melting point which is in a low degree subject to chemical attack, such for example as tantalum, tungsten, and particularly molybdenum, the said receptacle being enclosed within an electrically heated tubular furnace. Within the said receptacle there is a tubular core forming therewith the annular nozzle, the said core being likewise made from a metal of high melting point, such as tantalum, tungsten, and particularly molybdenum. In addition means are provided for separately applying protective gas, the gas being applied through the tubular core into the pipe being formed, into the top part of the melting receptacle, and into the annular space between the melting receptacle and the tubular furnace.

For the purpose of explaining the invention an example embodying the same has been shown in the accompanying drawing.

The said drawing shows the apparatus in sectional elevation.

In the example shown in the drawing the apparatus comprises a tubular melting receptacle 1 made from metal of high melting point, particularly molybdenum, the said receptacle being partly closed at its bottom by an annular bottom plate 2 which likewise consists of molybdenum. At the bottom part of the receptacle there is a concentric tubular core 4 which slightly extends downwardly beyond the bottom of the receptacle, and the diameter of which is smaller than the inner diameter of the bottom plate 2, the said bottom plate and core providing the annular nozzle 5 for the delivery of the glass. The axial bore of the said core is connected with a pipe 3 for the supply of an independent or reducing protective gas, such as nitrogen or a mixture of nitrogen and hydrogen. Also this pipe consists of metal of high melting point, particularly molybdenum. The core 4 is fixed in centered position by means of transverse arms 6. The melting receptacle is confined within an electrically heated tubular furnace which consists of a cylindrical body 7 of refractory material such as compressed zirconium oxide and an outer jacket 8 having a supply of cooling water. This jacket 8 is provided with an inlet 9' and an outlet 8", and further with two handles 25, 25 strengthened by eyes 24. By means of these handles 25, 25 the whole melting device is placed on two upwardly directed posts 27, 27 provided each with a shoulder 26. These posts 27, 27 are fastened to an angle-iron frame 28. On the inner wall of the refractory body 7 a heating coil or grate 9 of molybdenum or tungsten wire is located. At its top and bottom ends the furnace is closed by water cooled caps 10 and 11 respectively, which are also used for supplying electric current to the heating coil or grate 9. The upper cap 10 has an outer edge directed downwards which is dipped into the water content of a ring 29 of U-section, fastened to the cover plate 30 of the jacket 8. Through the upper cap 10 a pipe 12 is passed through which reducing or indifferent protective gas is supplied to the annular space provided between the melting receptacle and the wall of the furnace or the heating coil. The protective gas escapes through the open bottom end of the annular chamber. It may consist of hydrogen or a mixture of say 20% hydrogen and 80% nitrogen.

To the upper cap 10 a water cooled annular lid 13 is fixed which closes the annular chamber provided between the furnace and the melting receptacle at its top. To the said lid the melting receptacle 1 is fixed. To the top part of the melting receptacle 1 a pipe 14 is fixed through which the quartz to be melted is supplied, and which carries a lid 15. The pipe 3 is passed out of the receptacle 1 laterally of the pipe 14, and it is provided at its top and with a three-way cock 16 controlling pipes 17 and 18, the pipe 17 being connected with a supply of protective gas, and the pipe 18 communicating with the outer air. Finally, for supplying protective gas into the melting receptacle 1 a pipe 19 is passed through the wall of the pipe 14, the delivery end of the said pipe being directed downwardly and into the receptacle 1. The protective gas supplied through the pipe 19 preferably also consists of indifferent or reducing gas, nitrogen or a mixture of nitrogen and hydrogen being preferred. To the lower cap 11 is fixed by means of screw bolts 32 a ring plate 31 protecting the heating coil 9. Between the latter and the cap 11 is interposed an insulating ring 31'. This ring 31' also serves for the fixing of the one leading wire 9' of the heating coil 9. The other leading wire 9'' is led by means of an insulating bush 10' through the upper cap 10 and fixed to the heating coil.

Below the furnace thus described there are rollers 20 for guiding the pipe being drawn in rectilinear direction, and below the said rollers a pair of drawing bands 21 of a drawing machine are located. The rollers 20 arranged in pairs, are held by means of their bolts 35 by angle iron pieces 34 fixed to the cover plate 33 of the frame 28. Said bolts slideably mounted in said angle iron pieces 34, 35 are influenced by pressure springs 36. The drawing bands 21, 21 run over rollers 37 keyed on short shafts 38 which are supported by the frame 28. Preferably the two lower shafts 38 are driven by any suitable device not shown. Said drawing bands are provided with clamping pieces 39 which close over the pipe passing the guide rollers 20. In order to securely grip said pipe, each drawing band 21 is passed over a guide strap 40, said two guide straps being fixed to the frame 28 and placed parallel to the passing pipe. For the purpose of adjusting the drawing bands there is provided for each band a stretcher, consisting of a flat iron 42 slideably mounted by means of screws 43 in the frame 28, and of a roller 41 held by said flat iron.

The operation of the furnace is as follows:

The quartz to be melted is filled into the receptacle 1 through the pipe 14, and after being melted it is delivered through the annular nozzle 5 in the form of a pipe. Between the rollers 20 it is guided in rectilinear direction and caught by the drawing bands 21 of the drawing machine and pulled downwardly. At the beginning of the formation of the pipe the protective gas for the inner wall of the pipe is supplied from the top through the supply 17 and the pipe 3. When the pipe being drawn arrives below the bands 21 a tubular member 22 may be applied thereto which is connected with a supply 23 for protective gas. Now the three-way cock 16 is set into position for connecting the pipe 3 with the pipe 18 and the outer air, and the protective gas is supplied from the bottom end of the pipe being formed. While this manner of supplying the protective gas is preferred, it is not always necessary thus to reverse the direction of the flow of the said gas. After the desired length of pipe has been drawn out the pipe is cut off, and in the meantime the three-way cock is again set into position for supplying protective gas through the pipe 17, the said gas being again passed through the pipe from above.

By manufacturing the melting receptacle 1, 2 and the core 4 from metal or metals of high melting point, the wear of the said parts is considerably reduced, and any danger of forming carbide from the molten quartz is completely obviated. By heating the melting receptacle by electric energy no heating gas is produced, and therefore the quartz pipe being manufactured is not injured by the action of waste gas. The currents of protective gas remove any air from the molten quartz and from the parts of the furnace, and further, they prevent reaction between the quartz vapor and the hot metallic parts of the furnace. The last-named effect is particularly important, because such chemical reaction would impair the clearness of the glass and injure the furnace.

By supplying protective gas through the core 4 and into the quartz pipe being formed the quartz vapor cannot get into the said quartz pipe and produce a deposit on the inner wall thereof. The quartz vapor produced below the nozzle within the pipe cannot be precipitated therein, because it is removed downwardly and away from the quartz pipe together with the protective gas. By reason of the tubular shape of the melting receptacle the surface of the melting quartz within the receptacle is always covered by non-molten grains, so that the vapor of quartz has hardly the opportunity to get into the upper part of the melting receptacle which is not filled with quartz. This result is obtained because the melting in an upright, tubular receptacle proceeds in an entirely different manner than in a flat, pan-like receptacle with a large internal diameter. In the latter case the quartz or glass mass as a whole is always in a molten state, whereas, with a tubular receptacle according to the present invention, the quartz being constantly fed from above in short time intervals, there are always unfused quartz grains on the surface, and only the lower part of the charge is molten. The still unfused grains on the surface form a seal which prevents the vapors formed within the mass of molten quartz from passing off at the surface. The layer of granular, still unfused quartz always present on the surface of the entire quartz mass thus prevents the free upper part of the tubular receptacle from being filled with quartz vapors. Any quartz vapor which may get into the said receptacle is flushed out by the protective gas supplied to the top part of the receptacle, the said gas also preventing oxidation of the melting receptacle. By the protective gas supplied to the annular space between the melting receptacle and the inner wall of the furnace the melting receptacle and the heating coil are protected as against oxidation, and, in addition, when the said annular space is closed at its top and open at its bottom, the quartz vapor which is formed at the outside of the pipe and below the nozzle is flushed away, so that it is not precipitated on the outer wall of the pipe, and does not get into the furnace, where it might injure the heating coil.

The quartz pipes which are continuously made by means of my improved furnace are distinguished by uniformity of the wall. Further, they are free of air inclusions and perfectly clear. Particularly, the deposit of vaporized quartz on the outer and inner wall of the quartz pipe and dimming of the pipe connected therewith are avoided.

In describing the invention reference has been made to the drawing of glass from quartz. But I wish it to be understood that my invention is not limited to drawing quartz pipes, and that my improved furnace may also be advantageously used for drawing glasses having a high content of silicic acid.

I claim:

1. The herein described apparatus for drawing pipes from quartz or glass having a content of silicic acid, comprising a tubular melting receptacle made from metal of high melting point and formed at its bottom end as an annular nozzle for the delivery of the molten material, an electrically heated tubular furnace enclosing the said receptacle, and means for supplying protective gas into the pipe being formed, into the top part of the said receptacle, and into the space provided between the said receptacle and the furnace.

2. Apparatus as claimed in claim 1, in which the said annular nozzle is provided by a tubular core fitted concentrically within the said receptacle at the delivery end thereof, the said core being made from a metal of high melting point, and in which the said core is connected with a pipe for the supply of a protective gas therethrough.

3. Apparatus as claimed in claim 1, in which the metal from which the said receptacle and nozzle are formed is one of the metals of the group consisting of tantalum, tungsten, and molybdenum.

4. Apparatus as claimed in claim 1, comprising in addition means for closing the annular chamber between the melting receptacle and the tubular furnace at its top, the said chamber being open at its bottom, and in which the said protective gas supplying means includes means for supplying protective gas to the top part of the said chamber.

5. Apparatus as claimed in claim 1, in which the annular chamber between the said furnace and the melting receptacle is closed at its top by a lid providing a support for the melting receptacle.

6. Apparatus as claimed in claim 1, in which the annular chamber between the said furnace and the melting receptacle is closed at its top by a water cooled lid providing a support for the melting receptacle.

WALTER HÄNLEIN.